(12) United States Patent
Ishikawa

(10) Patent No.: US 11,167,553 B2
(45) Date of Patent: Nov. 9, 2021

(54) METHOD OF MANUFACTURING LIQUID EJECTION HEAD

(71) Applicant: CANON KABUSHIKI KAISHA, Tokyo (JP)

(72) Inventor: Masashi Ishikawa, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 16/423,441

(22) Filed: May 28, 2019

(65) Prior Publication Data

US 2019/0366718 A1 Dec. 5, 2019

(30) Foreign Application Priority Data

Jun. 4, 2018 (JP) .............................. JP2018-106904
Apr. 24, 2019 (JP) .............................. JP2019-083142

(51) Int. Cl.
*B41J 2/16* (2006.01)
*B32B 37/02* (2006.01)

(52) U.S. Cl.
CPC .............. *B41J 2/1623* (2013.01); *B32B 37/02* (2013.01); *B41J 2/162* (2013.01); *B41J 2202/22* (2013.01)

(58) Field of Classification Search
CPC .......... B41J 2/162; B41J 2/1623; B32B 37/02
See application file for complete search history.

(56) References Cited

U.S. PATENT DOCUMENTS

| | | | | |
|---|---|---|---|---|
| 2006/0274132 A1* | 12/2006 | Seo | ................ | B41J 2/1623 347/87 |
| 2012/0132350 A1* | 5/2012 | Takamatsu | ............ | B41J 2/1623 156/196 |
| 2013/0100208 A1* | 4/2013 | Ishikawa | ............. | B41J 2/14024 347/40 |

FOREIGN PATENT DOCUMENTS

JP 2011-33763 A 2/2011

OTHER PUBLICATIONS

"Tightening Sequence for a multiple bolt joint" https://www.boltscience.com/pages/tsequence.htm (Year: 2001).*

* cited by examiner

*Primary Examiner* — Philip C Tucker
*Assistant Examiner* — John Blades
(74) *Attorney, Agent, or Firm* — Venable LLP

(57) ABSTRACT

The method of manufacturing a liquid ejection head according to the invention includes a bonding step, that is, a step of placing a plurality of element substrates on an adhesive layer formed on a bonding surface and heating the adhesive layer to bond the element substrates to a base material. The bonding step is started from one or two of a plurality of bonding regions located at the center portion of the base material in an arrangement direction of the element substrates and then performed toward the bonding regions located at both end portions of the base material.

11 Claims, 8 Drawing Sheets

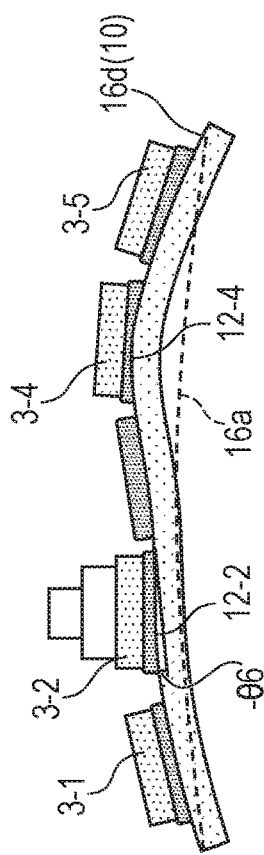
FIG. 6A
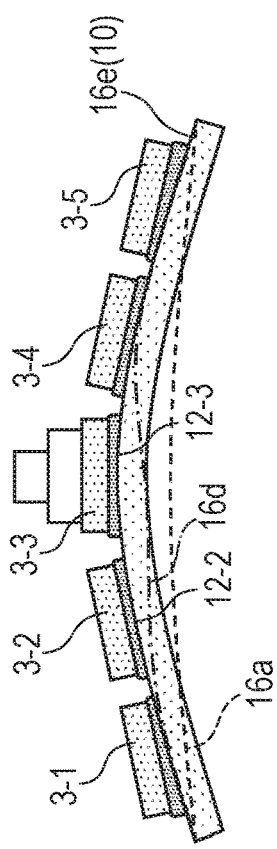
FIG. 6D
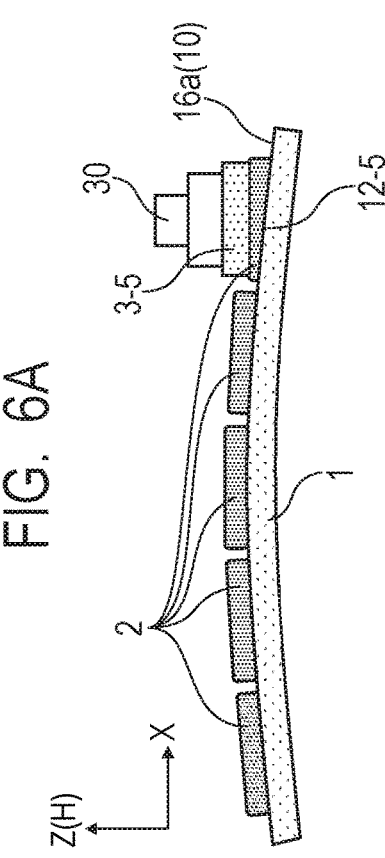
FIG. 6B
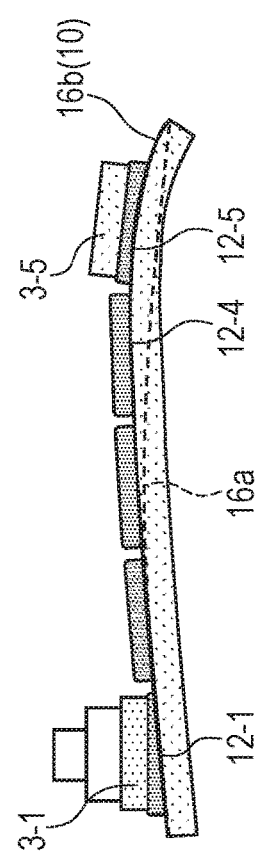
FIG. 6E
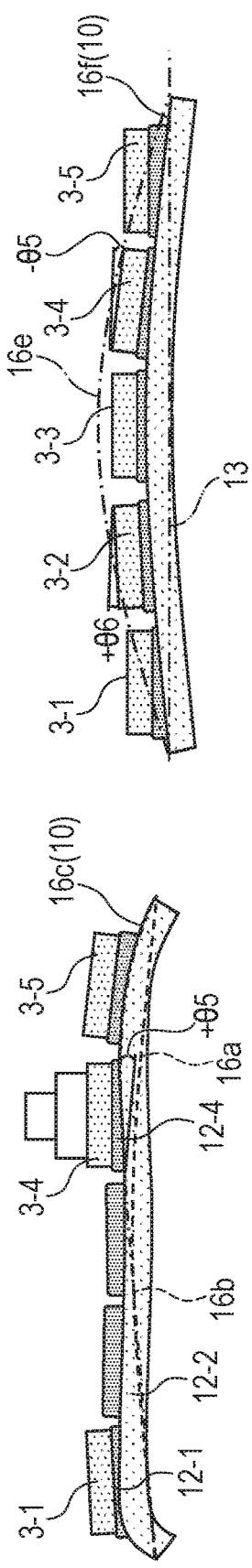
FIG. 6C
FIG. 6F

METHOD OF MANUFACTURING LIQUID EJECTION HEAD

BACKGROUND OF THE INVENTION

Field of the Invention

The present invention relates to a method of manufacturing a liquid ejection head that ejects a liquid from an ejection orifice.

Description of the Related Art

As a liquid ejection head to be used in a liquid ejection apparatus such as ink jet recording apparatus, there has recently been proposed a page-wide liquid ejection head obtained by arranging a plurality of element substrates equipped with an ejection orifice for ejecting a liquid such as ink on a base material over a length equal to or more than the width of a recording medium.

The page-wide liquid ejection head is desired to have a plurality of element substrates arranged in-line form (linearly) for downsizing. In such a liquid ejection head, however, a base material for bonding the element substrates thereto becomes long and liable to warp. As a result, a step difference sometimes occurs at a connection portion of the element substrates adjacent to each other. Such a step difference may cause misalignment of impact positions on a recording medium of a liquid ejected from these element substrates adjacent to each other and an image thus obtained inevitably a streak. Thus, the step difference may lead to deterioration in print quality. There is therefore a demand for reducing misalignment between impact positions of the liquid by adjusting the height of the elements substrates adjacent to each other and thereby decreasing the step difference generated at the connection portion.

As a technology of controlling the height of a member provided on a base material, there is known a technology of controlling the height of a bonding material for bonding the base material and the member (refer to Japanese Patent Application Laid-Open No. 2011-33763). Liquid ejection heads often use a thermosetting adhesive as a bonding material. In this case, element substrates and a base material are bonded to each other by placing the element substrates on the thermosetting adhesive applied to the base material and then heating and curing the thermosetting adhesive. At this time, by controlling the amount of the thermosetting adhesive to be applied to the base material and thereby adjusting the height of the thermosetting adhesive after curing, a step difference generated at a connection portion can be reduced.

SUMMARY OF THE INVENTION

The base material has however a temperature gradient in the thickness direction when heated for curing the thermosetting adhesive. This may cause a difference in an elongation amount of the base material due to expansion between the bonding surface of the base material to which the thermosetting adhesive has been applied and a surface opposite to the bonding surface and the base material may warp in a liquid ejecting direction.

When the base material has deformation such as warp during bonding between the base material and element substrates, the gradient of the bonding surface of the base material during bonding between the base material and the element substrates becomes different from that at normal temperatures. When the temperature of the base material returns to normal temperatures, the gradient of the bonding surface also returns to the original one. This causes such a problem that due to the gradient of the element substrates thus formed, a step difference generated at the connection portion between the element substrates adjacent to each other becomes large.

As a material of a base material to which element substrates are bonded, ceramics, metals and the like capable of easily providing parts with desired accuracy and having a small thermal linear expansion coefficient have conventionally been used. In recent years, on the other hand, ceramics or metals used as the material of the base material have been replaced by inexpensive resin molding materials in order to satisfy the demand for reducing the cost of a liquid ejection head. The resin molding materials have a large thermal linear expansion coefficient so that the base material deforms largely when heated to cure a thermosetting adhesive during bonding between the base material and the element substrates. The above-described step difference generated at the connection portion is therefore liable to increase. Thus, heating for bonding the element substrates may cause deformation of the base material and deteriorate the bonding accuracy of the element substrates to the base material.

The invention has been made in consideration of the above-described problem. An object of the invention is to provide a method of manufacturing a liquid ejection head capable of reducing deterioration in bonding accuracy of element substrates due to the heat at the time of bonding the element substrates to a base material.

In a method of manufacturing a liquid ejection head according to the invention, the liquid ejection head has a plurality of element substrates for ejecting a liquid and a base material equipped with a bonding surface having a plurality of bonding regions to which the element substrates are bonded via an adhesive layer formed with a thermosetting adhesive and having a long length along an arrangement direction of the element substrates. The method includes a bonding step, that is, a step of placing the element substrates on the adhesive layer formed on the bonding surface and heating the adhesive layer to bond the element substrates to the base material. The bonding step is started from one or two of the bonding regions placed at a center portion of the base material in the arrangement direction and is then performed toward the bonding regions placed at both end portions of the base material.

The invention makes it possible to reduce deterioration in bonding accuracy of the element substrates due to heat at the time of bonding the element substrates to the base material.

Further features of the present invention will become apparent from the following description of exemplary embodiments with reference to the attached drawings.

BRIEF DESCRIPTION OF THE DRAWINGS

FIGS. 6A, 6B, 6C, 6D, 6E and 6F show the state of the base material in a bonding step of Second Embodiment of the invention.

DESCRIPTION OF THE EMBODIMENTS

Figure 1A:
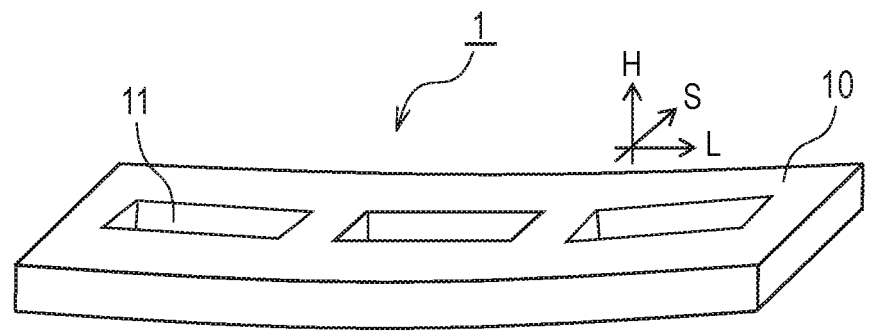
FIGS. 1A, 1B and 1C show a base material of First Embodiment of the invention.

The embodiments of the invention will hereinafter be described referring to accompanying drawings. In each drawing, members having the same function will be identified by the same reference numeral and an overlapping description may be omitted.

First Embodiment

In the present embodiment, a method of manufacturing a page-wide (line) liquid ejection head in which a plurality of element substrates for ejecting a liquid such as ink is arranged on a base material (support member) in in-line form (linearly) will be described. The constitution of the liquid ejection head in the present invention is not limited to that described in the following embodiments but it may have a plurality of element substrates arranged in zigzag form on a base material. The liquid ejection head is not limited to a line head (liquid ejection head) insofar it has a plurality of element substrates arranged thereon and it may be a scanning type head that scans in a direction crossing the conveying direction of a recording medium such as paper.
<Substrate>

Figure 1B:
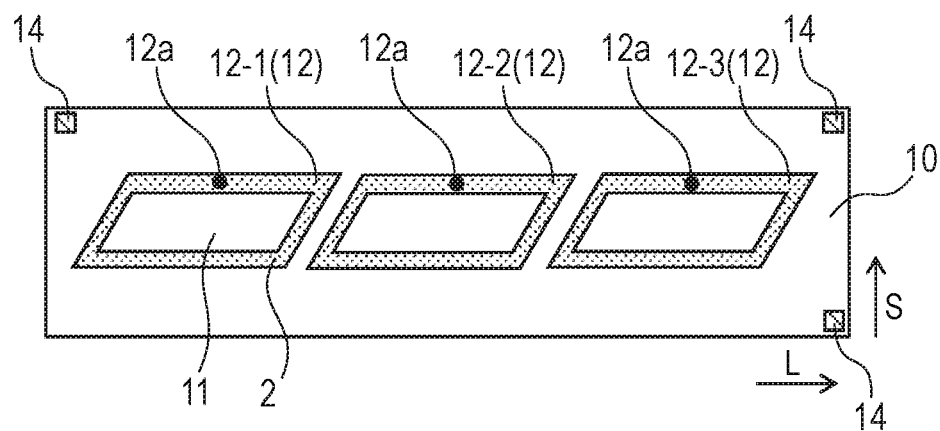
Figure 1C:
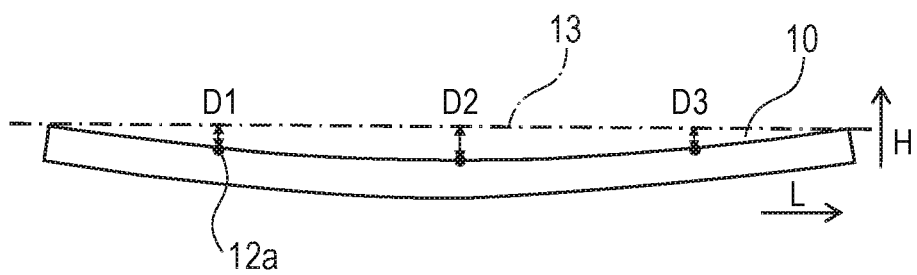

FIGS. 1A to 1C show a base material of the present embodiment. FIG. 1A is a perspective view showing the base material, FIG. 1B is a top view of the base material shown in FIG. 1A and FIG. 1C is a side view of the base material shown in FIG. 1A.

A base material 1 shown in FIG. 1A is obtained by molding or forming a resin molding material, more specifically, a thermosetting resin. A bonding surface 10 of the base material 1 to which element substrates (not shown in FIGS. 1A to 1C) are to be bonded has a plurality of supply ports 11 for supplying the element substrates with a liquid. In the example shown in FIGS. 1A to 1C, the base material has three supply ports 11.

The element substrates are, for the supply ports 11, bonded (more specifically, adhered) to the base material 1 so as to cover the supply ports 11, respectively. Regions surrounding the supply ports 11 therefore become bonding regions 12 to which the element substrates are bonded, respectively. In the example shown in FIGS. 1A to 1C, three supply ports 11 are provided in in-line form along a longer direction L so that three bonding regions 12 are provided in in-line form along the longer direction L. When these three bonding regions 12 should be distinguished, they will hereinafter be called bonding regions 12-1 to 12-3 in order left to right in FIG. 1B.

The bonding regions 12 have an adhesive layer 2 for bonding the element substrates thereto, respectively. The adhesive layer 2 is made of a thermosetting adhesive which is cured by heating.

As shown in FIG. 1C, the bonding surface 10 of the base material 1 at normal temperatures before bonding of the element substrates thereto has a concave warp, more specifically, the bonding surface 10 has a concave warp when viewed from a shorter direction S of the base material 1. The height of the base material 1 at a position in a liquid ejecting direction H (direction substantially orthogonal to the longer direction L and the shorter direction S) differs, depending on the position in the longer direction L. The respective heights of the bonding regions 12-1 to 12-3 are therefore different from each other.

The height of the bonding region 12 is determined, depending on a reference distance which is a distance between a virtual reference plane 13 serving as the reference of the bonding surface 10 in the ejecting direction H and a middle point 12a in an arrangement direction of the bonding regions 12, that is, in the longer direction L. The virtual reference plane 13 is a virtual plane passing three reference regions 14 provided on the bonding surface 10 of the base material 1. The reference regions 14 are provided at three of four corners of the bonding surface 10. The virtual reference plane 13 is substantially orthogonal to the ejecting direction H. The above-described specifying manner of the virtual reference plane 13 of the bonding surface 10 is shown merely as one example and the virtual reference plane 13 may be specified in another manner. However, the bonding surface 10 of the base material 1 often has a concave warp as in the present embodiment or the bonding surface 10 often has a convex warp as in the embodiment described later. As in the present embodiment, therefore, it is preferred to provide a reference region 14 at three corners of the bonding surface 10, specify a virtual reference plane 13 that passes them and determine the height of the bonding region 12 based on it.

Supposing that reference distances to the bonding regions 12-1 to 12-3 are D1 to D3, respectively, the reference distances D1 to D3 have the following relationship: D2>D3>D1 in the example shown in FIG. 1C. Since the base material 1 has a concave shape, the bonding regions 12-1 to 12-3 have the following order when put in order from the lowest position: 12-2, 12-3 and 12-1. In the present embodiment, a difference between the reference distance D1 and the reference distance D2 is 0.1 mm, meaning that a warp in a range of the base material 1 provided with the bonding regions 12 is about 0.1 mm.

The above-described constitution of the base material 1 is merely one example and the constitution is not limited thereto. For example, the base material 1 may be made of, as a material, a mixture obtained by adding an additive such as ceramic or metal to a thermosetting resin.

(Bonding Apparatus)

Figure 2A:
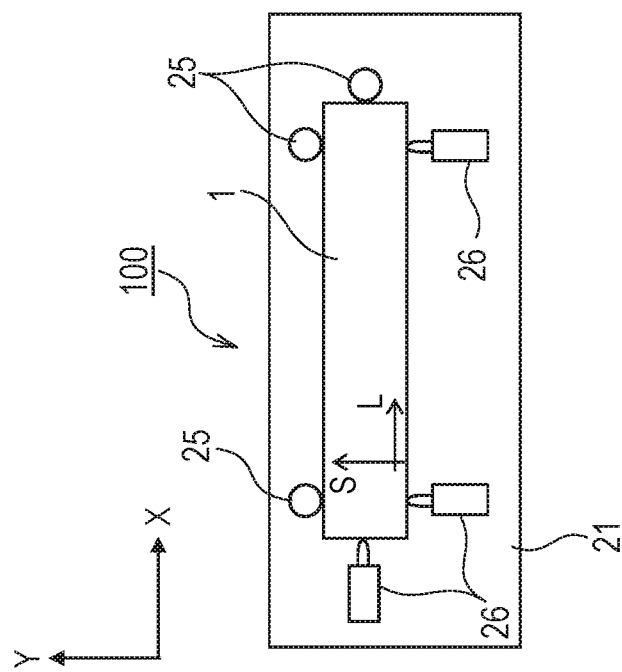
FIGS. 2A and 2B are schematic views showing a bonding apparatus of First Embodiment of the invention.
Figure 2B:
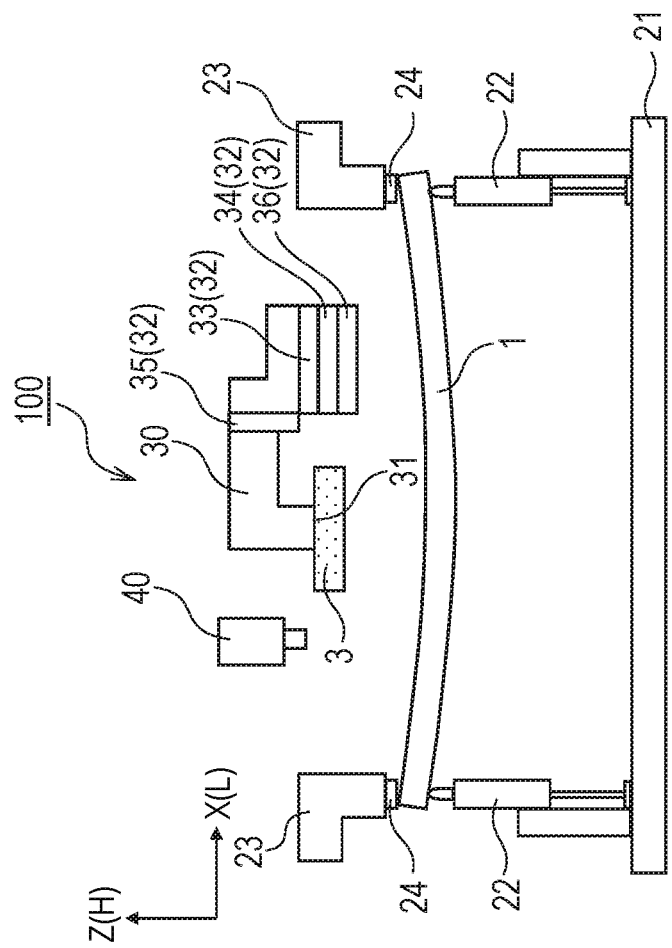

FIGS. 2A and 2B are schematic views schematically showing a bonding apparatus for bonding the element substrate to the base material 1. FIG. 2A is a side view of the bonding apparatus and FIG. 2B is a top view of the bonding apparatus. The bonding apparatus 100 shown in FIGS. 2A and 2B has a support base 21 and a cylinder 22 supported by the support base 21. The cylinder 22 is a support unit for supporting the base material 1. The cylinder 22 supports each of the both end portions, in the longer direction L, of the base material 1. The cylinder 22 moves the base material 1 supported thereby in a Z direction, which is a substantially perpendicular direction, bringing the base material 1 into contact with an abutting member 23, and thereby determining the position of the base material 1 in the Z direction. The abutting member 23 has a Z reference surface 24 along a substantially horizontal XY plane and the position of the base material 1 in the Z direction is determined by bringing the Z reference surface 24 into contact with the reference region 14 of the base material 1 shown in FIG. 1B. After the position of the base material 1 in the Z direction is determined, therefore, the Z reference surface 24 is substantially parallel to the virtual reference plane 13 passing the reference region 14. FIG. 2A shows the base material 1 brought into contact with the Z reference surface 24 of the abutting member 23.

The bonding apparatus 100 has positioning pins 25 and clamps 26 that sandwich the base material 1 from the X direction and the Y direction. The positioning pins 25 and the clamps 26 are positioning members for determining the position of the base material 1 on the XY plane.

The bonding apparatus 100 has a finger 30 which is a unit for holding the element substrate 3. The finger 30 has an adsorbing surface 31 for adsorbing the element substrate 3 thereto and it holds the element substrate 3 by adsorbing the element substrate 3 to the adsorbing surface 31. FIGS. 2A and 2B show the element substrate 3 held by the finger 30 serving as a holding unit.

The finger 30 is supported by a drive unit 32 for driving the finger 30. The drive unit 32 has an X stage 33 for driving the finger 30 along the X direction, a Y stage 34 for driving it along the Y direction, a Z stage 35 for driving it along the Z direction and a $\theta_z$ stage 36 for rotating and driving it with the Z direction as a rotation axis.

The bonding apparatus 100 uses the drive unit 32 to drive the finger 30 having the element substrate 3 held therewith, convey the element substrate 3 and place the element substrate 3 on the base material 1. During this movement, the direction of the finger 30 is adjusted in advance so that the adsorbing surface 31 of the finger 30 becomes substantially parallel to the Z reference surface 24 of the abutting member 23. The element substrate 3 therefore becomes substantially parallel to the virtual reference plane 13 of the base material 1 when the element substrate 3 is placed on the base material 1. If the drive unit 32 has a stage for making the adsorbing surface 31 of the finger 30 parallel to the Z reference surface 24 of the abutting member 23, the adsorbing surface 31 of the finger 30 can also be made substantially parallel to the Z reference surface 24 of the abutting member 23 by adjusting the direction of the finger 30 by means of the drive unit 32. The finger 30 is equipped with a temperature adjusting unit (not shown) as a heating unit such as heater and by using this temperature adjusting unit, the adsorbing surface 31 is heated to a desired heating temperature.

The bonding apparatus 100 has a photographing apparatus 40 for forming a photographed image of an alignment mark (not shown) provided on at least one of the base material 1 and the element substrate 3. The photographed image is used for determining a relative position of the element substrate 3 to the base material 1.

The adhesive layer 2 on the base material 1 shown in FIG. 1B is formed in advance by applying a thermosetting adhesive thereto before the element substrate 3 is placed on the base material 1.

<Bonding Step of Element Substrate>

In the bonding step for bonding the element substrate 3 to the base material 1, the base material 1 supported by the cylinder 22 is brought into contact with the Z reference surface 24 of the abutting member 23 and then the element substrate 3 is adsorbed to the absorbing surface 31 of the finger 30 to have the finger 30 hold the element substrate 3. Then, the drive unit 32 is used to drive the finger 30 and place the element substrate 3 on the adhesive layer 2 formed in the bonding region 12 of the base material 1. The direction of the finger 30 is adjusted in advance so that the adsorbing surface 31 of the finger 30 becomes substantially parallel to the Z reference surface 24 of the abutting member 23. The adhesive layer 2 is then cured by heating and the element substrate 3 is bonded to the base material 1 via the adhesive layer 2.

In the present embodiment, the adhesive layer 2 is heated by a temperature adjusting unit which the finger 30 has. More specifically, the adsorbing surface 31 of the finger 30 is heated to a desired heating temperature by the temperature adjusting unit and when the element substrate 3 is placed on the adhesive layer 2, the heat is transferred from the adsorbing surface 31 to the adhesive layer 2 via the element substrate 3.

At this time, the adsorbing surface 31 is heated to the desired heating temperature before adsorbing the element substrate 3. The heating temperature or heating time is determined as needed by the curing temperature of the thermosetting adhesive that forms the adhesive layer 2. In the present embodiment, the heating temperature is 150° C. and the heating time for bonding one element substrates 3 is 10 sec. The heating is performed by the finger 30 and bonding of the element substrate 3 is performed at the normal atmospheric temperature.

In the present embodiment, the element substrates 3 are bonded one by one to the base material 1 by means of the heated finger 30 so that while the base material 1 is heated and deformed due to bonding of the element substrate 3 (first element substrate) by means of the finger 30, the next element substrate 3 (second element substrate) is bonded. It is possible to reduce the time necessary for the bonding step by performing bonding of the next element substrate 3 before the base material 1 deformed by means of the finger 30 is restored to its normal-temperature state.

The above-described bonding step is performed for the bonding regions 12-1 to 12-3 of the base material 1 in the predetermined order. In the present embodiment, the bonding step is performed for the bonding regions 12-1 to 12-3 in an ascending order of the height (position in the ejecting direction H) of the base material 1 from the bonding region 12-2 having the lowest height. In other words, in the order of the bonding regions 12-2, 12-3 and 12-1, the element substrates 3 are placed on the adhesive layer 2 formed thereon and the element substrates 3 are bonded to the base material 1.

The height of the bonding regions 12-1 to 12-3 can be found by measuring the reference distances D1 to D3, respectively. The reference distances D1 to D3 are measured in advance by a distance measurement device (not shown) provided outside the bonding apparatus 100. Alternatively, it may be measured in the bonding apparatus 100 by loading a displacement gauge on the bonding apparatus 100.

FIGS. 3A to 3D show the state of the base material 1 in the bonding step of the present embodiment. FIGS. 3A to 3D show the states of the base material 1 at different time points, respectively, so that the bonding surface 10 has different shapes, depending on the state. The bonding surface 10 of the base material 1 shown in FIGS. 3A to 3D may hereinafter be called bonding surfaces 10a to 10d, respectively. The element substrates 3 to be bonded to the bonding regions 12-1 to 12-3 will be called "element substrates 3-1 to 3-3", respectively. At the time when the element substrates 3-1 to 3-3 are bonded, respectively, the element substrates 3-1 to 3-3 are substantially parallel to the Z reference surface 24 (adsorbing surface 31 of the finger 30) of the abutting member 23 shown in FIG. 2A, in other words, substantially parallel to the virtual reference plane 13 of the base material 1.

Figure 3A:
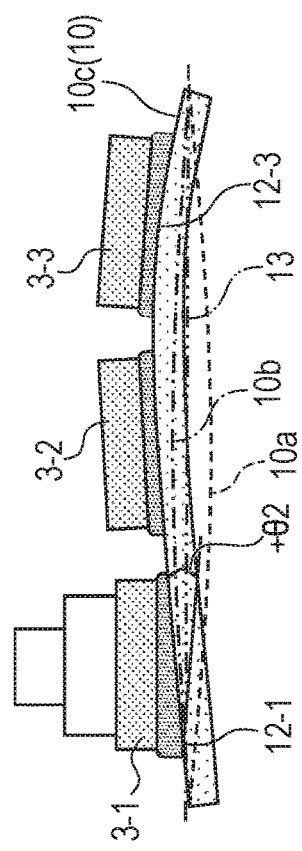
FIGS. 3A, 3B, 3C and 3D show the state of the base material in a bonding step of First Embodiment of the invention.

First, the element substrate 3-2 is bonded to the bonding region 12-2 of the base material 1. At this time, the base material 1 is substantially free from the influence of heat so that it can be bonded to the base material 1 which is substantially not deformed as shown in FIG. 3A. The bonding surface 10a in this state is substantially similar to that at normal temperatures and the element substrate 3-2 is bonded to the base material 1 at an angle substantially equal to that at normal temperatures.

Figure 3C:
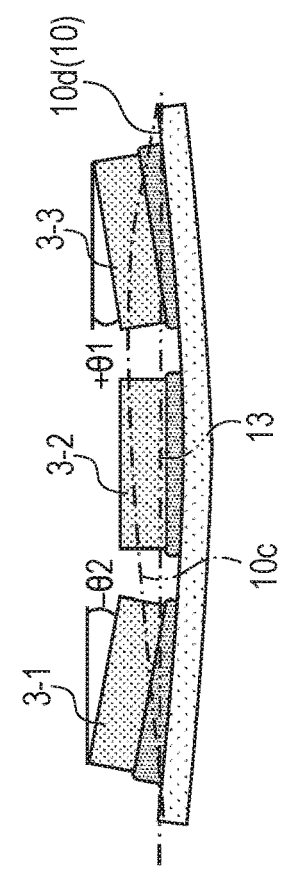
Figure 3B:
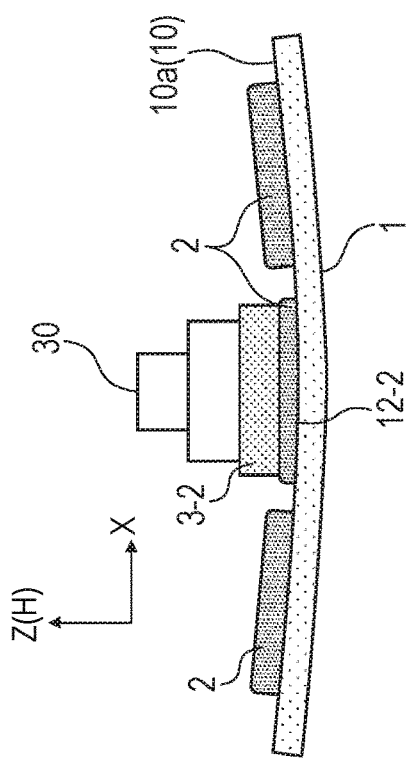

Next, the element substrate 3-3 is bonded to the bonding region 12-3 of the base material 1. At this time, the base material 1 has been heated by the adsorbing surface 31 of the finger 30 during previous bonding of the element substrate 3-2 so that the base material 1 has been elongated by this heat. At this time, the bonding surface 10 of the base material 1 becomes hotter than the surface opposite thereto (back surface of the bonding surface 10) so that an elongation amount is large. As shown in FIG. 3B, therefore, the previously heated bonding region 12-2 is elevated and the base material 1 is deformed in a direction of having a convex shape.

On the bonding surface 10b in this state, the bonding region 12-3 of the base material 1 inclines by −θ1 with respect to the bonding surface 10a at normal temperatures. The element substrate 3-3 is therefore bonded in more parallel to the virtual reference plane 13 (adsorbing surface 31 of the finger 30) than that at normal temperatures. The angle showing the inclination of the bonding region 12 is positive when measured in a counterclockwise direction from the bonding surface 10a at normal temperatures.

Then, the element substrate 3-1 is bonded to the bonding region 12-1 of the base material 1. At this time, the bonding surface 10 of the base material 1 shows more elongation than the surface opposite thereto and as shown in FIG. 3C, the bonding region 12-3 of the base material 1 is elevated. On the bonding surface 10c in this state, the bonding region 12-1 of the base material 1 inclines by +θ$_2$ with respect to the bonding surface 10a at normal temperatures. The element substrate 3-1 is therefore bonded in more parallel to the virtual reference plane 13 than that at normal temperatures.

Figure 3D:
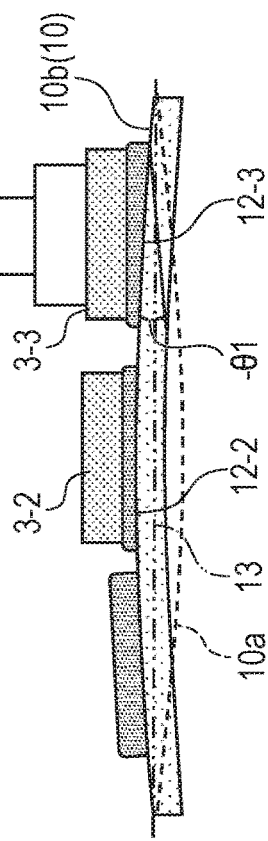

When the base material 1 returns to the normal temperature, the base material 1 is restored to its original state as shown in FIG. 3D and the bonding surface 10d becomes substantially similar to the bonding surface 10a. In such a state, the element substrate 3-2 is substantially parallel to the virtual reference plane 13 which extends along the X direction, while the element substrates 3-1 and 3-3 incline by −θ2 and +θ1, respectively, with respect to the virtual reference plane 13.

FIGS. 4A to 4D show the states of the base material 1, respectively, in the bonding step of Comparative Example. In Comparative Example, the element substrates 3-3, 3-2 and 3-1 are bonded to the base material 1 in order of mention. FIGS. 4A to 4D show the states of the base material 1 at time points different from each other in Comparative Example so that the bonding surface 10 has different shapes at respective states. The bonding surface 10 of the base material 1 shown in FIGS. 4A to 4D may hereinafter be called "bonding surfaces 15a to 15d", respectively.

Figure 4A:
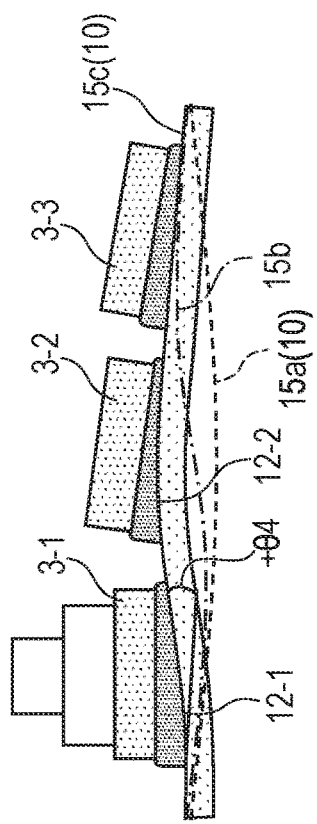
FIGS. 4A, 4B, 4C and 4D show the state of a base material in a bonding step of Comparative Example.

First, the element substrate 3-3 is bonded to the bonding region 12-3 of the base material 1. At this time, the base material 1 is substantially free from the influence of the heat so that it can be bonded to the base material 1 which is substantially not deformed as shown in FIG. 4A. The bonding surface 15a in this state has a shape substantially similar to that at normal temperatures so that the element substrate 3-3 is bonded to the base material 1 at an angle substantially equal to that at normal temperatures.

Figure 4C:
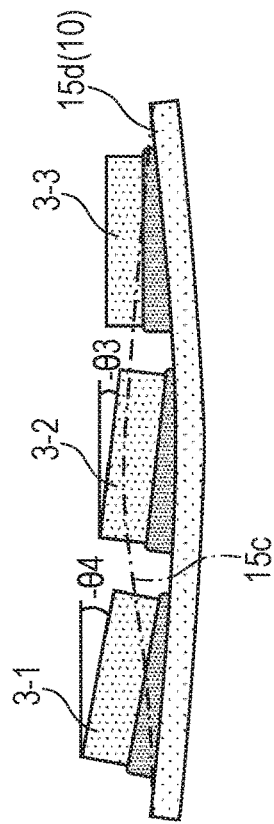
Figure 4B:
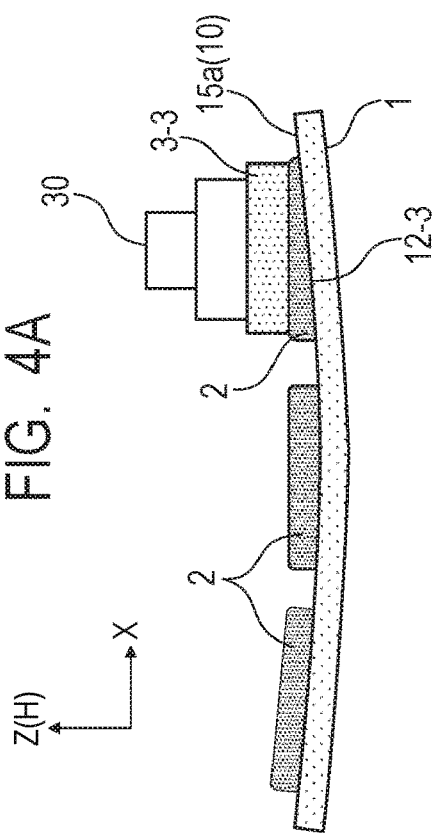

Next, the element substrate 3-2 is bonded to the bonding region 12-2 of the base material 1. At this time, the base material 1 to which the element substrate 3-3 is bonded has been heated by the adsorbing surface 31 of the finger 30 in advance so that the base material 1 has been elongated by this heat. The bonding surface 10 of the base material 1 becomes hotter than the surface opposite thereto so that an elongation amount is large. As shown in FIG. 4B, the previously heated bonding region 12-3 is elevated and the base material 1 is deformed to have an S-shape. On the bonding surface 15b in such a state, the bonding region 12-2 of the base material 1 inclines by +θ3 with respect to the bonding surface 15a at normal temperatures.

Then, the element substrate 3-1 is bonded to the bonding region 12-1 of the base material 1. At this time, the bonding surface 10 of the base material 1 is elongated more than the surface opposite thereto and as shown in FIG. 4C, the bonding region 12-2 is elevated. On the bonding surface 15c in this state, the bonding region 12-1 of the base material 1 inclines by +θ4 with respect to the bonding surface 15a at normal temperatures.

Figure 4D:
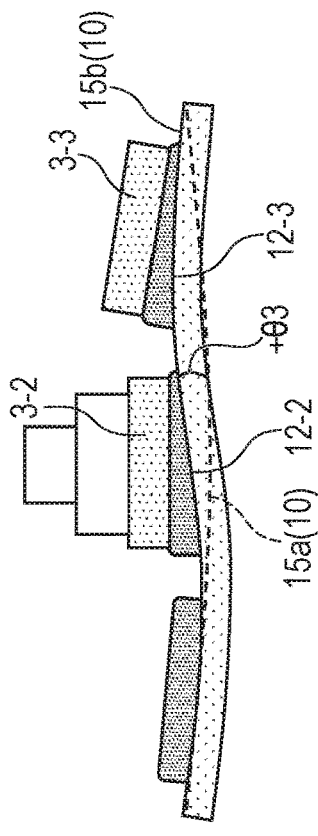

When the base material 1 returns to the normal temperature, the base material 1 is restored to its original state as shown in FIG. 4D and the bonding surface 15d becomes substantially similar to the bonding surface 15a. In such a state, the element substrate 3-3 is substantially parallel to the virtual reference plane 13 which extends along the X direction, while the element substrates 3-2 and 3-1 tilt by −θ3 and +θ4, respectively, with respect to the virtual reference plane 13.

In Comparative Example, as shown in FIG. 4D, the element substrates 3-1 and 3-2 adjacent to each other incline in the same direction at normal temperatures. This increases a step difference generated at the connection portion between the element substrates 3-1 and 3-2. In the present embodiment, on the other hand, as shown in FIG. 3D, a step difference generated at the connection portion between the element substrates 3 adjacent to each other decreases because the element substrates 3 adjacent to each other do not incline in the same direction.

As described above, the present embodiment has a bonding step, that is, a step of placing a plurality of element substrate 3 on an adhesive layer 2 made of a thermosetting adhesive on a base material 1 and heating the adhesive layer 2 to bond the element substrates 3 to the base material 1. The bonding step is performed for a plurality of bonding regions 12-1 to 12-3 of the base material 1, to which the element substrates 3 are bonded, in an ascending order of the height of the bonding region in a liquid ejecting direction, starting from the bonding region having the lowest height. This makes it possible to elevate the bonding region 12-2 having a low ejecting-direction-height by the heat for curing the adhesive layer 2 and thereby deforming the base material 1 in a direction extending straight toward the virtual reference plane 13. As a result, the element substrates 3 can be bonded along the base material 1 and a step difference generated at the connection portion between the element substrates 3 adjacent to each other can be reduced.

In the present embodiment, the bonding step is performed in an ascending order of the height of the bonding region, starting from the bonding region having the lowest liquid ejecting-direction-height. The base material 1 can therefore be deformed to approach a straight line, making it possible to further reduce a step difference generated at the connection portion between the element substrates 3 adjacent to each other.

The term "element substrate 3" as used herein means a substrate equipped with an element for generating a pressure for ejecting a liquid. Examples of this element include heating elements and piezo elements. A unit obtained by supporting the above-described element-having substrate by a support via an adhesive or the like may also be called "element substrate 3" so that a liquid ejection head may have a constitution in which a plurality of the above-described units (a plurality of element substrates 3) is bonded to the base material 1. In this case, for example, ceramics, metals, or the like having a linear expansion coefficient smaller than that of the base material 1 may be used as the support.

Second Embodiment

<Base Material>

Figure 5A:
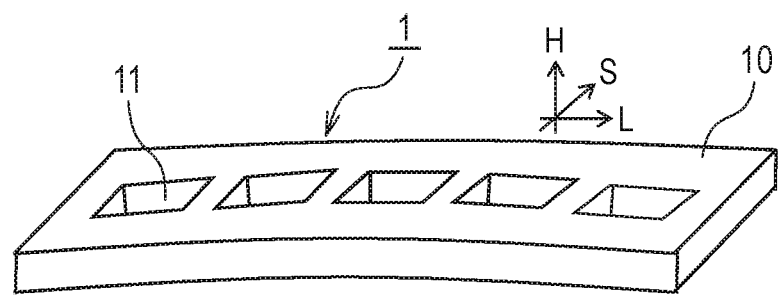
FIGS. 5A, 5B and 5C show a base material of Second Embodiment of the invention.
Figure 5B:
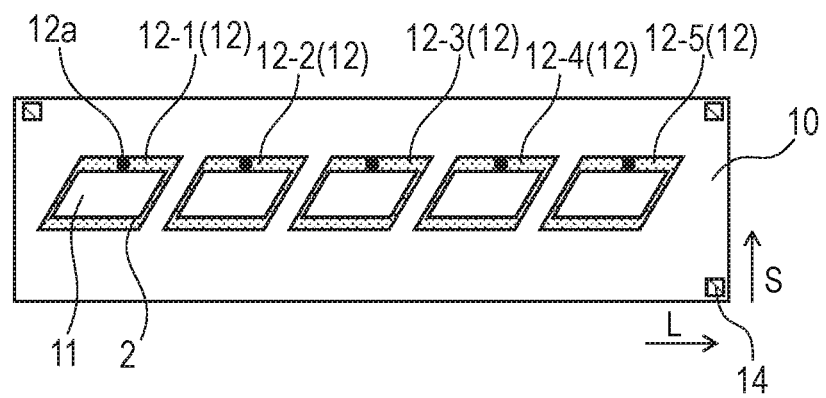
Figure 5C:
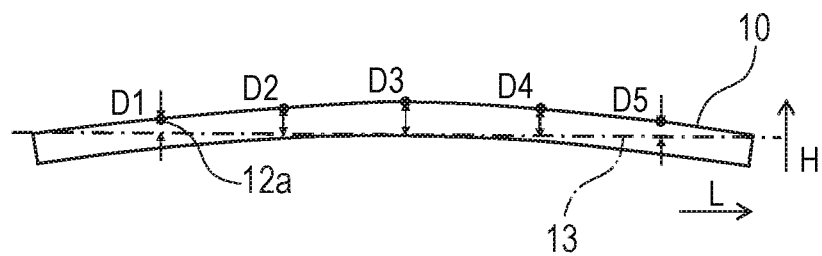

FIGS. 5A to 5C show the base material in the present embodiment. More specifically, FIG. 5A is a perspective view showing the base material, FIG. 5B is a top view of the base material shown in FIG. 5A and FIG. 5C is a side view of the base material shown in FIG. 5A.

The base material 1 of the present embodiment shown in FIGS. 5A to 5C is different from the base material 1 of First Embodiment shown in FIGS. 1A to 1C in that the former one has five supply ports 11 and has a bonding surface 10 having a convex warp (a warp of the bonding surface 10 has a convex shape when viewed from the shorter direction, that is, S direction of the base material 1) at normal temperatures. The base material in the present embodiment has five supply ports 11 so that it has five bonding regions 12. In order to distinguish these five bonding regions 12, they will hereinafter be called "bonding regions 12-1 to 12-5", respectively, in the order from left to right in FIG. 5B.

The height of the bonding regions 12-1 to 12-5 is defined, as in First Embodiment, by reference distances D1 to D5, each a distance between a virtual reference plane 13 and a middle point 12a of the bonding region 12 in a longer direction L. In the present embodiment, the reference distances D1 to D5 have the following relationship: D3>D2>D4>D1>D5. The base material 1 has a convex shape so that the bonding regions 12-1 to 12-5 are rearranged in an ascending order from the lowest position into the bonding regions 12-5, 12-1, 12-4, 12-2 and 12-3.

<Bonding Step of Element Substrate>

FIGS. 6A to 6F show the states of the base material 1 in the bonding step of the present embodiment. FIGS. 6A to 6F show the states of the base material 1 at different time points, respectively, so that the bonding surface 10 in these states is different in shape. The bonding surface 10 of the base material 1 shown in FIGS. 6A to 6F may hereinafter be called "bonding surfaces 16a to 16f", respectively. Element substrates 3 to be bonded to bonding regions 12-1 to 12-5 will be called "element substrates 3-1 to 3-5", respectively. The element substrates 3 are bonded to the base material 1 in an ascending order of the ejecting-direction height of the bonding region as in First Embodiment. In addition, the bonding step of the element substrates 3 to the base material 1 is performed as in First Embodiment.

First, the element substrate 3-5 is bonded to the bonding region 12-5 of the base material 1. At this time, the base material 1 is substantially free from the influence of heat so that bonding can be performed while the base material is substantially not deformed as shown in FIG. 6A. The bonding surface 16a in this state is substantially similar to that at normal temperatures and the element substrate 3-5 is bonded to the base material 1 at an angle substantially equal to that at normal temperatures.

Next, the element substrate 3-1 is bonded to the bonding region 12-1 of the base material 1. The base material 1 has been elongated by the heat from the finger 30. At this time, as shown in FIG. 6B, the previously heated bonding region 12-5 and the bonding region 12-4 in the vicinity thereof are elevated, but the bonding region 12-1 is substantially not deformed. On the bonding surface 16b in this state, therefore, the element substrate 3-1 is bonded to the base material 1 at an angle substantially equal to that at normal temperatures.

Further, the element substrate 3-4 is bonded to the bonding region 12-4 of the base material 1. At this time, the base material 1 has been elongated further by the heat from the adsorbing surface 31 of the finger 30 and as shown in FIG. 6C, the previously heated bonding region 12-1 and the bonding region 12-2 in the vicinity thereof have been elevated. On the bonding surface 16c in this state, the bonding region 12-4 of the base material 1 inclines by +θs with respect to the bonding surface 16a at normal temperatures, because it has been elevated at the time of bonding the element substrate 3-5 to the bonding region 12-5. The element substrate 3-4 is therefore bonded in more parallel to the virtual reference plane 13 than that at normal temperatures.

Then, the element substrate 3-2 is bonded to the bonding region 12-2 of the base material 1. At this time, the base material 1 has been elongated more by the heat from the adsorbing surface 31 of the finger 30 and as shown in FIG. 6D, the bonding region 12-4 has been elevated. On the bonding surface 16d in this state, the bonding region 12-2 of the base material 1 inclines −θ6 with respect to the bonding surface 16a at normal temperatures. The element substrate 3-2 is therefore bonded in more parallel to the virtual reference plane 13 than that at normal temperatures.

The element substrate 3-3 is then bonded to the bonding region 12-3 of the base material 1. At this time, the base material 1 has been elongated more by the heat from the adsorbing surface 31 of the finger 30 and as shown in FIG. 6E, the previously heated bonding region 12-2 has been elevated and the base material 1 has a convex shape. The entire bonding surface 16e in this state becomes more elevated than the bonding surface 16a at normal temperatures.

When the base material 1 returns to the normal temperature, the base material 1 is restored to its original state as shown in FIG. 6F and the bonding surface 16f becomes substantially similar to the bonding surface 16a. In such a state, the element substrates 3-1, 3-3 and 3-5 become substantially parallel to the virtual reference plane 13, while the element substrates 3-2 and 3-4 incline by +θ6 and −θ5, respectively, with respect to the virtual reference plane 13.

As in First Embodiment, the element substrates 3 adjacent to each other do not incline in the same direction so that a step difference generated at the connection portion between the element substrates 3 adjacent to each other is reduced.

As described above, even if the base material 1 has a convex shape as in the present embodiment, the base material 1 can be changed in shape to a direction extending straight along the virtual reference plane 13. This makes it possible to reduce a step difference generated at a connection portion between the element substrates 3 adjacent to each other.

Third Embodiment

Figure 7:
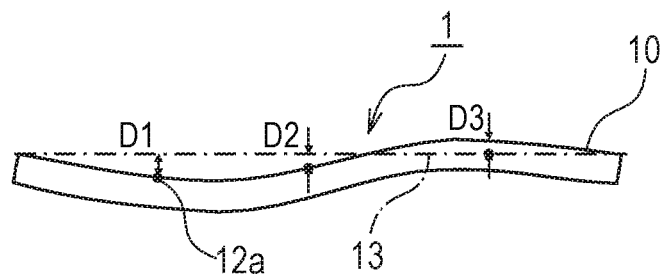
FIG. 7 shows a base material of Third Embodiment of the invention.

FIG. 7 is a side view showing a base material of the present embodiment. The base material 1 of the present embodiment shown in FIG. 7 is different from the base material 1 in First Embodiment shown in FIG. 1C in that the former base material 1 has a warp having an S shape when viewed from the shorter direction, that is, S direction of the base material 1.

Also in the present embodiment, the height of the bonding region 12 is defined by a reference distance between a virtual reference plane 13 serving as a reference of the bonding surface 10 in the ejecting direction H and a middle point 12a of the bonding region 12 in the L direction. In the present embodiment, supposing that reference distances to the bonding regions 12-1 to 12-3 are D1 to D3, respectively, the reference distances D1 to D3 have the following relationship: D1>D2>D3. Also in the present embodiment similar to First Embodiment, the bonding step is performed for the bonding regions 12-1 to 12-3 in an ascending order of the height, that is, the position of the base material 1 in the ejecting direction H, from the bonding region 12-1 having the lowest height. This means that in the order of the bonding regions 12-1, 12-2 and 12-3, the element substrates 3 are placed on the adhesive layer 2 formed thereon and the element substrates 3 are bonded to the base material 1, respectively.

Even if the base material 1 has an S-shape as in the present embodiment, by performing the bonding step for the bonding regions 12-1 to 12-3 successively from the bonding region having the lowest height in the ejecting direction H, a step difference generated at the connection portion between the element substrates 3 adjacent to each other can be reduced.

Fourth Embodiment

Figure 8A:
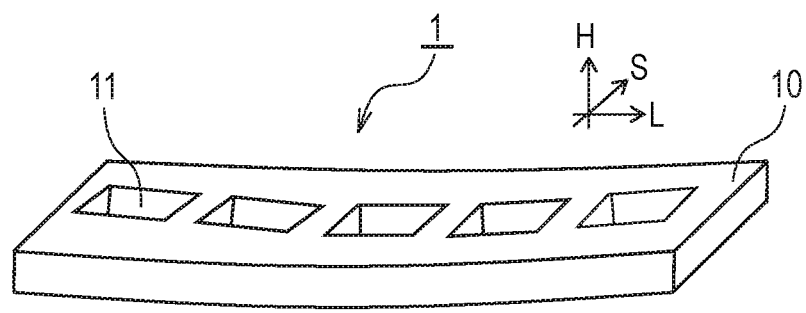
FIGS. 8A, 8B and 8C show a base material of Fourth Embodiment of the invention.
Figure 8B:
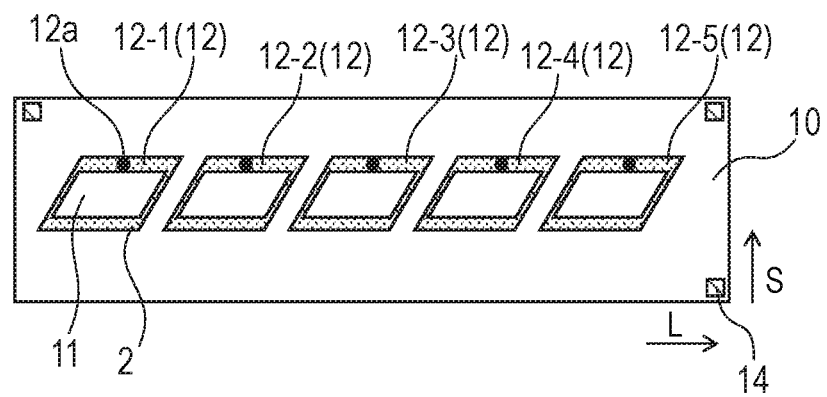
Figure 8C:
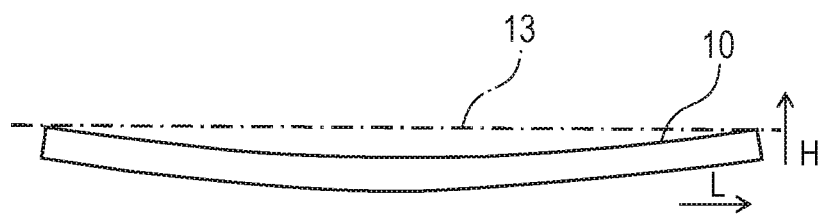

FIG. 8A to FIG. 8C show a base material of the present embodiment. More specifically, FIG. 8A is a perspective view showing the base material, FIG. 8B is a top view of the base material shown in FIG. 8A and FIG. 8C is a side view of the base material shown in FIG. 8A.

The base material 1 of the present embodiment shown in FIG. 8A to FIG. 8C has five supply ports 11 and in this point, it is different from the base material 1 of First Embodiment shown in FIGS. 1A to 1C. Since the base material of the present embodiment has five supply ports 11, it has five bonding regions 12 correspondingly. When these five bonding regions 12 are distinguished from one another, they will hereinafter be called "bonding regions 12-1 to 12-5" in the order left to right in FIG. 8B.

First, the base material 1 is placed on the cylinders 22 of the bonding apparatus 100 so that the bonding surface 10 of the base material 1 has a concave shape.

Next, element substrates 3 are bonded to the base material 1 by means of the finger 30. In the present embodiment, the bonding step for bonding the element substrates 3 to the base material 1 is similar to that in First Embodiment, but the bonding order of the element substrates 3 to the base material 1 is different from that of First Embodiment. In the present embodiment, the bonding step for the bonding regions 12-1 to 12-5 of the base material 1 is started from the bonding region 12-3 located at the center of the base material 1 in the longer direction L and is then performed alternately toward the both ends of the base material 1 while having the bonding region 12-3 therebetween. In short, the bonding step is performed in the order of the bonding regions 12-3, 12-2, 12-4, 12-1 and 12-5. Alternatively, the bonding step may also be performed in the order of the bonding regions 12-3, 12-4, 12-2, 12-5 and 12-1.

The present embodiment makes it possible to reduce a step difference generated at the connection portion between the element substrates 3 adjacent to each other except the element substrate 3 to be bonded between the bonding region 12-3 and a bonding region of the base material 1 having a height at the lowest position. In addition, the present embodiment makes it possible to bond the element substrates 3 to the base material 1 more speedily because it does not require measurement of a reference distance and makes it possible to reduce a cost because it does not require installment of a measuring unit for measuring a reference distance. For example, when as in Comparative Example shown in FIGS. 4A to 4D, bonding of the element substrates 3 is performed successively for the bonding region 12 present at the end portion and then for the bonding region 12 adjacent thereto, the latter bonding region 12 is heated by the finger 30 until just before bonding of it and bonding of it should be performed without reducing a large deformation amount caused by the heating. In the present embodiment, bonding to the center bonding region 12-3 is followed by bonding to the bonding region 12-2 adjacent to the bonding region 12-3 (or followed by bonding to the bonding region 12-4). Next, the bonding to the bonding region 12-4 not adjacent to the bonding region 12-2 (or the bonding region 12-2 not adjacent to the bonding region 12-4) is performed. The bonding to the bonding region 12-4 (or the bonding region 12-2) is performed not just after completion of the heating of the bonding region 12-3 adjacent thereto so that it is performed while reducing a deformation amount due to heating of the bonding region 12-3. Alternate bonding while sandwiching the bonding region 12-3 as in the present embodiment makes it possible to achieve bonding while reducing the deformation amount caused by heating and bond the element substrates 3 to the base material 1 accurately.

In the present embodiment, the number of the element substrates 3 is odd, but if the number of the element substrates 3 is even, bonding may also be performed successively from the center portion of the base material 1. This means that after one of the element substrate 3 is bonded to either one of two center bonding regions of the base material 1, another one of the element substrates 3 is bonded to the other center bonding region and then, alternate bonding is performed toward the both ends of the base material 1.

When as shown in FIGS. 5A to 5C, the base material 1 has a convex bonding surface 10 at normal temperatures, in other words, the base material 1 is placed on the cylinders 22 of the bonding apparatus 100 so as to have a convex bonding surface 10, the element substrates 3 may be bonded to the base material 1 in the following manner. Described specifically, the bonding step for the bonding regions 12-1 to 12-5 may be started from the bonding region located at one end portion of the base material 1 and is then performed alternately toward the center of the base material 1, while sandwiching the bonding region located at the center of the base material. In short, the bonding step may be performed in the following order: the bonding regions 12-1, 12-5, 12-2, 12-4 and 12-3 or in the following order: the bonding regions 12-5, 12-1, 12-4, 12-2 and 12-3.

In this case, it becomes possible to reduce a step difference generated at the connection portion between the element substrates 3 adjacent to each other except the element substrate 3 to be bonded between the bonding region 12-1 or the bonding region 12-5 and a bonding region of the base material 1 having a height at the lowest position. In addition, since measurement of a reference distance is not necessary, the element substrates 3 can be bonded to the base material 1 more speedily and since installment of a measuring unit for measuring a reference distance is not necessary, cost reduction can be achieved. Further, bonding can be performed while reducing a deformation amount due to heating because one or two bonding regions 12 adjacent to each other except the bonding region 12-3 to be bonded lastly are not bonded successively.

The base material 1 which is long in the arrangement direction of the element substrates 3 often has a shape as shown in FIG. 8C or the shape as shown in FIG. 5C at normal temperatures. This means that the bonding region in the vicinity of the center portion of the bonding surface 10 or the bonding region in the vicinity of the both end portions, each in the longer direction of the base material 1, is often located at the lowest position in the ejecting direction. It is therefore only necessary to find whether the bonding surface 10 of the base material 1 at normal temperatures has a concave shape or convex shape. When it is a concave shape as in the present embodiment, the bonding of the element substrates 3 may be performed from the center and when the bonding surface 10 has a convex shape, bonding of the element substrates 3 may be performed from the end portion.

Fifth Embodiment

In the above-described embodiments, the element substrates 3 are bonded along the base material 1 by changing the shape of the base material 1 so as to extend in a straight direction. When the base material 1 has a different shape, the bonding order of the element substrates 3 is changed. In the present embodiment, on the other hand, bonding of the element substrates 3 to the base material 1 which has a long shape extending along the arrangement direction of the element substrates 3 is started from the bonding region at the center portion in the arrangement direction and is then performed toward the bonding region on the side of the both end portions.

Described specifically, when the bonding surface 10 of the base material 1 has a concave shape in the arrangement direction of element substrates 3 as shown in FIG. 3A to FIG. 3D, one of the element substrates 3 is bonded to the bonding region 12-2 and then, the other element substrates are bonded to the bonding region 12-1 and the bonding region 12-3, respectively, as shown in FIG. 3A to FIG. 3D. When the bonding surface 10 of the base material 1 has a convex shape as shown in FIG. 6A to FIG. 6F, element substrates 3 are bonded in an order different from that shown in FIG. 6A to FIG. 6F. Described specifically, one of the element substrates 3 is bonded to the bonding region 12-3 at the center portion of the base material 1 and then, the remaining element substrates 3 are alternately bonded to the bonding regions 12-2, 12-4, 12-1 and 12-5 in order of mention while having the bonding region 12-3 therebetween. Even if the bonding surface 10 of the base material 1 is flat different from the shape in the embodiment where it is concave as shown in FIG. 3A to FIG. 3D or convex as shown in FIG. 6A to FIG. 6F, bonding is performed similarly by starting bonding of one element substrate 3 to a bonding region at the center portion and then bonding the remaining element substrates 3 alternately to the other bonding regions while having the center bonding region therebetween.

Also in the present embodiment similar to the above-described embodiments, the element substrates 3 are bonded while heating an adhesive layer 2, on which the element substrates 3 are placed, by means of a finger 30 equipped with a temperature adjusting unit. Since bonding of the element substrates 3 is started from the bonding region at the center portion and then performed toward the bonding regions on the side of the both end portions as in the present embodiment, the element substrates 3 can be bonded while dispersing the heat accumulated by heating in the base material 1. Although the base material 1 is deformed by heating, the element substrates 3 can be bonded to the base material 1 stabilized in shape. This makes it possible to reduce a time necessary for the bonding step and at the same time, reduce deterioration in bonding accuracy of the element substrates 3 due to deformation of the base material 1 due to heat.

Described above is an example of starting bonding of an element substrate 3 to the bonding region at the center of the base material 1 and then performing bonding toward the both end portions of the base material 1 alternately with the center-bonding region therebetween, but the present embodiment is not limited thereto. For example, bonding of an element substrate 3 to the bonding region at the center may be followed by simultaneous bonding, to the bonding regions on both sides adjacent to the element substrate 3, of other element substrates 3. In short, bonding of the element substrates 3 may be performed successively from the center bonding region toward the both-end bonding regions. Alternatively, after bonding of the element substrate 3 to the center bonding region, it is possible to perform the bonding step by bonding some element substrates 3 successively to the bonding regions located on one side of the center bonding region without performing alternate bonding with the center bonding region as a center. In short, bonding of the element substrates 3 may be performed from the center bonding region toward the both-side end portions. In order to bond element substrates 3 with good accuracy while dispersing accumulation of the heat on the base material 1, it is preferred to start bonding from the center bonding region and then bond the element substrates 3 alternately with the center bonding region as a center.

In the above-described embodiments, the constitutions shown in the drawings are merely examples and the invention is not limited to or by these constitutions.

In each embodiment, the base material 1 and the element substrates 3 are closely bonded via the adhesive layer 2, but a floating bonding system in which the base material 1 and the element substrates 3 are bonded with a space therebetween may be used instead.

The number of the element substrates 3 is 3 or 5, but it is not limited thereto. In order to constitute a line head, for example, 10 or more element substrates 3 may be loaded on the base material 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-106904, filed on Jun. 4, 2018, and Japanese Patent Application No. 2019-083142, filed on Apr. 24, 2019, which are hereby incorporated by reference herein in their entirety.

What is claimed is:

1. A method of manufacturing a liquid ejection head having:
   a plurality of element substrates for ejecting a liquid and
   a base material equipped with a bonding surface having a plurality of bonding regions to which the element substrates are bonded via an adhesive layer formed with a thermosetting adhesive and having an elongated shape along an arrangement direction of the element substrates extending between two end portions, the method comprising:
a step of placing the element substrates on the adhesive layer formed on the bonding surface and heating the adhesive layer to bond the element substrates to the base material,
wherein the bonding step is started from one or two bonding regions located at a center portion of the base material in the arrangement direction and then performed toward bonding regions located at both of the end portions of the base material.

2. The method according to claim 1, wherein the bonding step is performed successively from the one or two bonding regions located at the center portion toward the bonding regions located at both of the end portions.

3. The method according to claim 1, wherein the bonding step is started from the one or two bonding regions located at the center portion and then performed alternately for the bonding regions having therebetween the one or two of the bonding regions located at the center portion.

4. The method according to claim 1, wherein the bonding surface has a concave shape in the arrangement direction before the element substrates are bonded thereto.

5. The method according to claim 1, wherein the bonding regions are arranged linearly.

6. The method according to claim 1, wherein the base material is formed with a thermosetting resin.

7. The method according to claim 1, wherein in the bonding step, the element substrates are held by a holding unit equipped with a heating portion and the thermosetting adhesive is heated by the heating portion.

8. The method according to claim 1, wherein in the bonding step, the element substrates are bonded so as to be substantially parallel to a virtual plane passing three reference regions of the bonding surface.

9. The method according to claim 8, wherein the reference regions are provided at three of four corners of the bonding surface.

10. The method according to claim 1, wherein the liquid ejection head is a line head.

11. The method according to claim 1, wherein after bonding of a first one of the element substrates, a second one of the element substrates is bonded while the base material is deformed by heating in the bonding of the first one.

* * * * *